US006425614B1

(12) United States Patent
Limber et al.

(10) Patent No.: US 6,425,614 B1
(45) Date of Patent: Jul. 30, 2002

(54) LIGHT STRING ATTACHMENT ACCESSORY

(75) Inventors: Jamie A. Limber, Gilbert; Robert I Vasquez; Daniel J. Dick, both of Phoenix, all of AZ (US)

(73) Assignee: The Christmas Light Company, Chandler, AZ (US)

( * ) Notice: Subject to any disclaimer, the term of this patent is extended or adjusted under 35 U.S.C. 154(b) by 0 days.

(21) Appl. No.: 09/773,966

(22) Filed: Feb. 1, 2001

Related U.S. Application Data

(63) Continuation of application No. 29/124,931, filed on Jun. 14, 2000, now abandoned.

(51) Int. Cl.[7] ............................... B25J 1/00; B25J 1/04; B65H 75/40

(52) U.S. Cl. .......................... 294/24; 294/19.1; 294/26; 242/405.3; 248/219.2

(58) Field of Search ........................... 248/218.4, 219.2, 248/309.2; 242/405, 405.3, 406, 398, 400, 597.3; 362/109, 431; 294/19.1, 24, 26, 158; 206/702; D8/14

(56) References Cited

U.S. PATENT DOCUMENTS

| | | | | | |
|---|---|---|---|---|---|
| 785,774 | A | * | 3/1905 | Strehlow | 24/129 R |
| 909,729 | A | * | 1/1909 | Wollam | 294/24 |
| 1,367,063 | A | * | 2/1921 | Logan | 294/26 |
| 2,347,718 | A | * | 5/1944 | Terry | 114/221 R |
| D261,595 | S | * | 11/1981 | Yellin | 294/2 |
| D302,231 | S | * | 7/1989 | Millar, Jr. | D8/14 |
| D340,846 | S | * | 11/1993 | Nichols, Jr. | D8/14 |
| 5,743,485 | A | * | 4/1998 | Martorelli et al. | 156/577 |
| 5,868,334 | A | * | 2/1999 | Cedillo | 206/420 |
| 6,241,176 | B1 | * | 6/2001 | McEntee | 242/405.3 |
| 6,352,291 | B1 | * | 3/2002 | Tortajada | 294/24 |

* cited by examiner

*Primary Examiner*—Leslie A. Braun
*Assistant Examiner*—Jon Szumny
(74) *Attorney, Agent, or Firm*—The Halvorson Law Firm

(57) ABSTRACT

An attachment device that is designed to be mounted onto a pole or other lengthy object. The device has two major components: a pole mounting portion attached to a spool mounting portion. By mounting the device onto the pole, the reach of a user is extended such that the user need not mount a ladder when mounting the light strings onto the building or other structure. The spool mounting section is designed to removably and rotationally receive an ornamental light string, ready to distribute stored ornamental light strings.

11 Claims, 10 Drawing Sheets

LIGHT STRING ATTACHMENT ACCESSORY

This application is a continuation of U.S. Design application Ser. No. 29/124,931, filed on Jun. 14, 2000, now abandoned.

FIELD OF THE INVENTION

The present invention relates to the field of ornamental light strings. More specifically, the present invention is a device useful for attaching ornamental light strings to buildings and the like.

BACKGROUND

It can be appreciated that holiday decorating has become a popular activity. The number of houses and businesses in any given urban area that actively decorate exterior surfaces is increasing at a significant rate. Indeed, in many areas, neighbors and neighborhoods participate in decorating contests, where individual neighbors or neighborhoods attempt to create the most aesthetically pleasing display.

Currently, the primary component in building or outdoor displays lies with ornamental light strings. These are light strings that have a plurality of individual light elements electrically connected either in-series or in-parallel. These ornamental light strings are usually attached to edges of buildings or windows to create an outline effect. Other effects are the spiral encirclement of a tree or other vertical object, or extensions across surfaces to create a lined or gridded effect. Recently, there have been efforts to create additional effects with light strings, such as the currently popular "icicle" light strings, which hang vertically from an edge to create the illusion of icicles hanging from the eaves in winter.

One problem with holiday decorating has been the inability to easily and conveniently attach or mount the light strings onto buildings and the like. A typical user drives multiple nails into the fascia of a building and attempts to wrap the light strings around projecting portions of the nails, typically while standing precariously on a ladder. Moreover, the mounting of the light strings, in many parts of the country, is accomplished in winter conditions: icy, snowing and the like. Thus, it can be seen that mounting ornamental light strings from a ladder is difficult, inconvenient, and dangerous at best.

Therefore, it can be seen that there is a need for devices that allow the easy and convenient mounting of ornamental light strings onto building and the like, without the need to mount a ladder.

SUMMARY OF THE INVENTION

It is an object of the present invention to provide a device that allows the easy and convenient mounting of ornamental light strings onto a building and the like.

It is another object of the present invention to provide an ornamental light string attachment device that may be attached to a pole or other lengthy object in order to extend the reach of the attachment device.

It is yet another object of the present invention to provide an ornamental light string attachment device that includes a spool support and spool spindle for easily unwinding ornamental light strings that are wrapped in a spool type storage unit.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DESCRIPTION OF PREFERRED EMBODIMENTS

The present invention is an assembly that is useful for the easy and convenient mounting of ornamental light strings onto a building and the like. The present invention is an attachment assembly that is designed to be mounted onto a pole or other lengthy object. By mounting the assembly of the present invention onto the pole, the reach of a user is extended such that the user need not mount a ladder when mounting the light strings onto the building or other structure.

The device of the present invention has two major portions, a top portion 10, or a spool mounting portion, and a bottom portion 40, or a pole mounting portion. The top and bottom portions, 10 and 40, are designed to attach together via mating screw section that will be described later.

Figure 1:
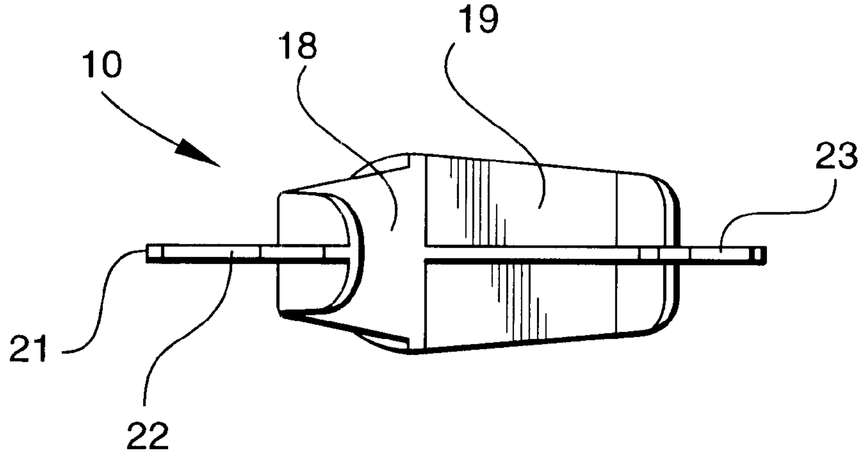
FIG. 1 is a top view of the top portion of the assembly, according to the present invention.
Figure 2:
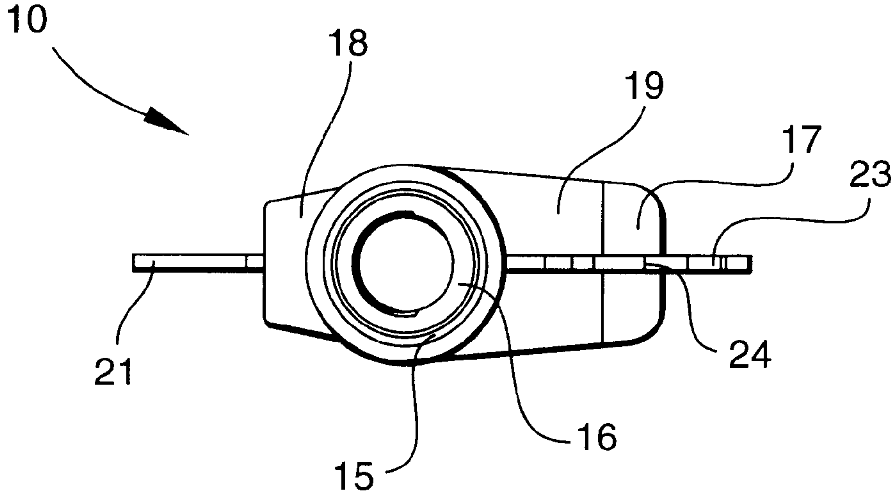
FIG. 2 is a bottom view of the top portion of the assembly, according to the present invention.
Figure 3:
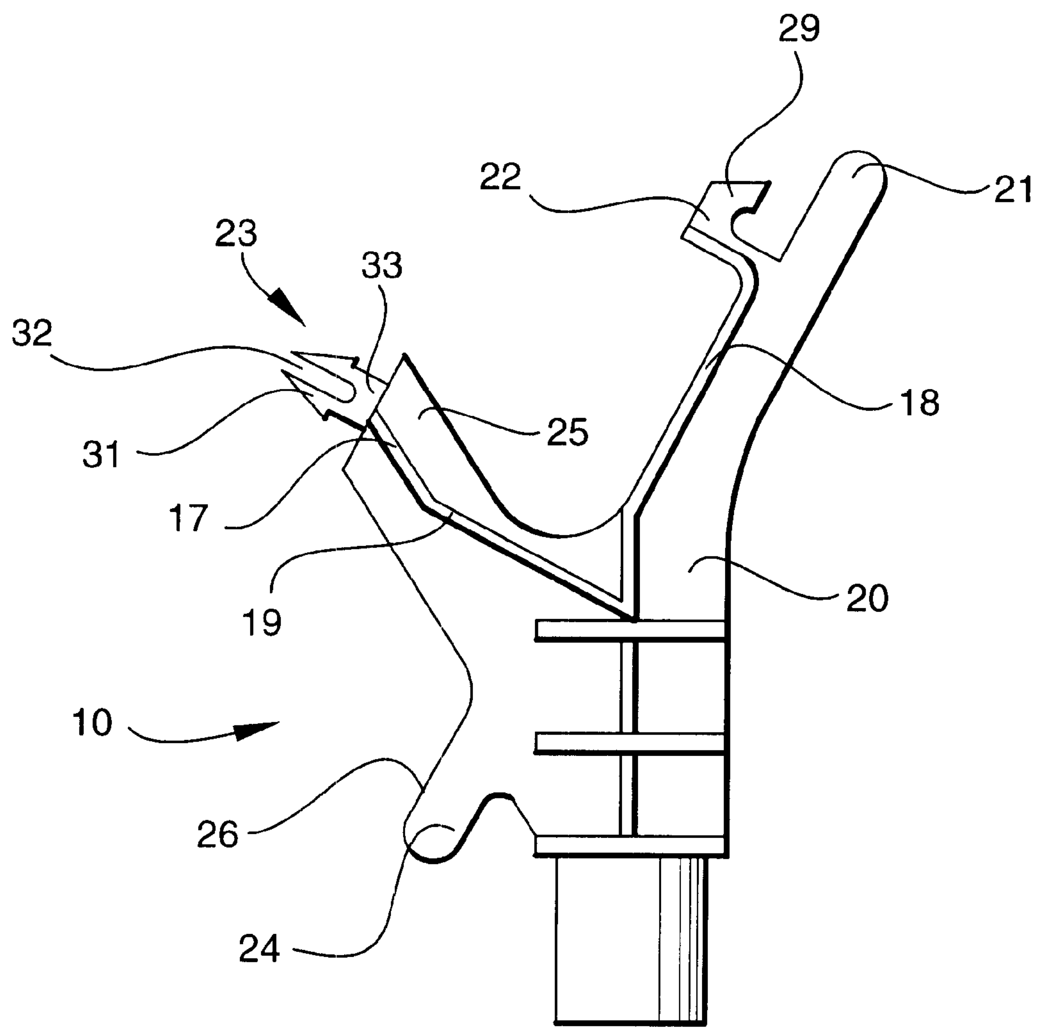
FIG. 3 is one side view of the top portion of the assembly, according to the present invention.
Figure 4:
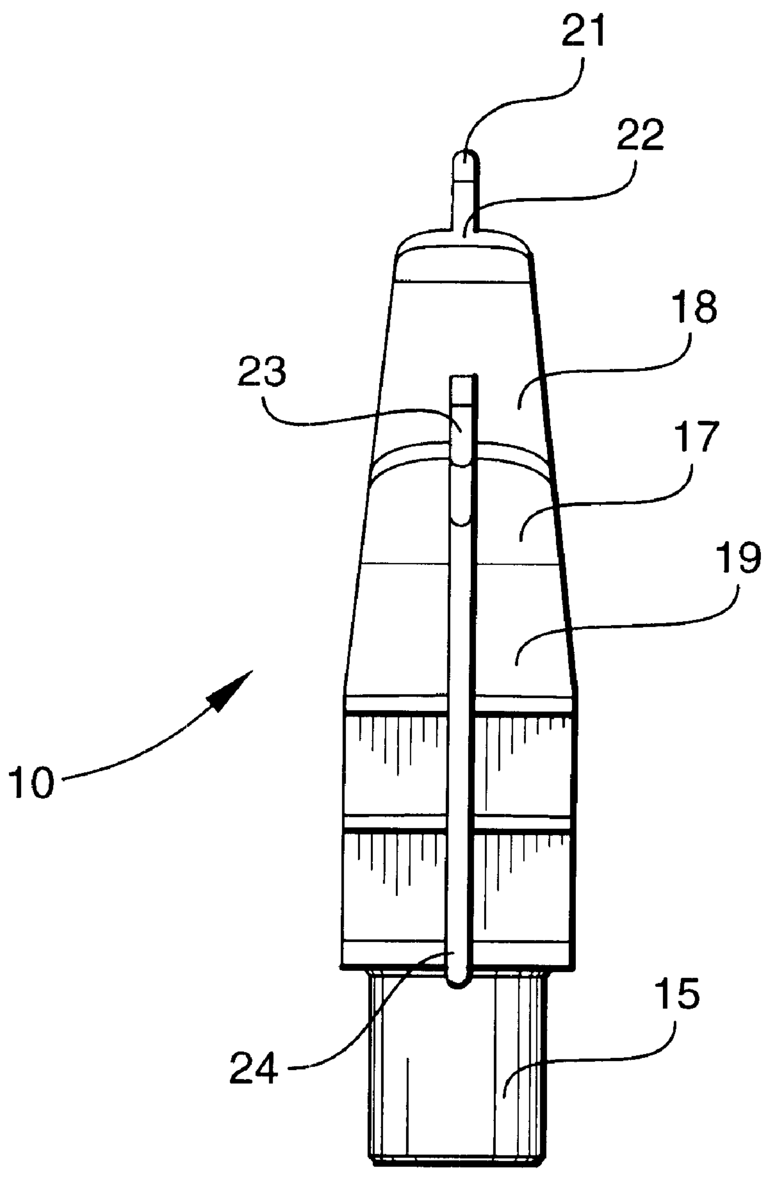
FIG. 4 is another side view of the top portion of the assembly (rotated 90 degrees from the view of FIG. 3), according to the present invention.
Figure 5:
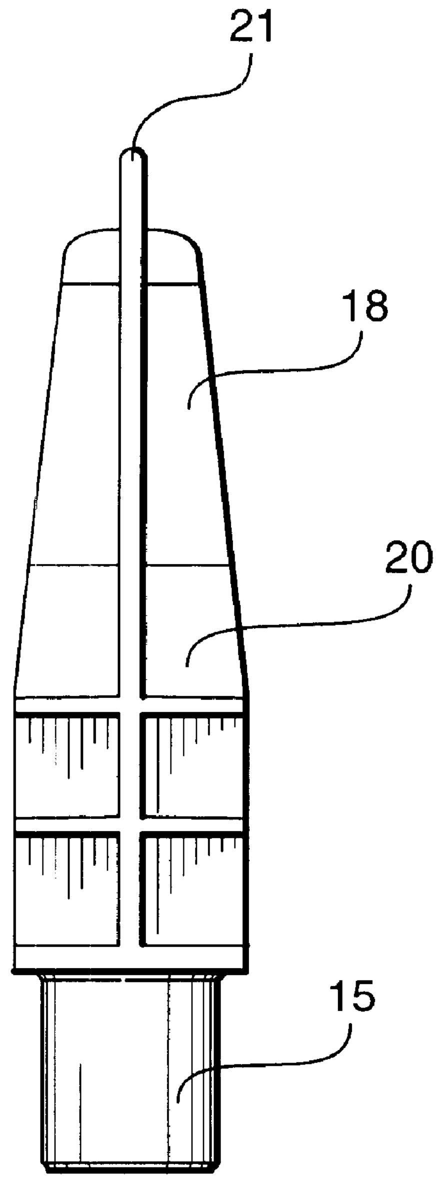
FIG. 5 is yet another side view of the top portion of the assembly (rotated 90 degrees from the view of FIG. 3 and 180 degrees from the view of FIG. 4), according to the present invention.
Figure 6:
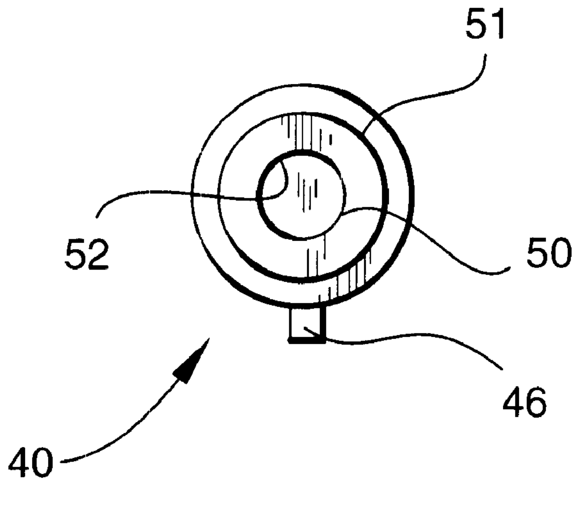
FIG. 6 is a top view of the bottom portion of the assembly, according to the present invention.
Figure 7:
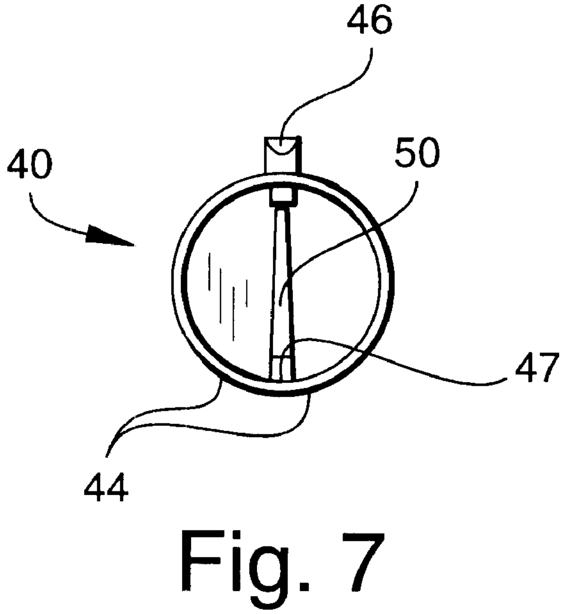
FIG. 7 is a bottom view of the bottom portion of the assembly, according to the present invention.
Figure 8:
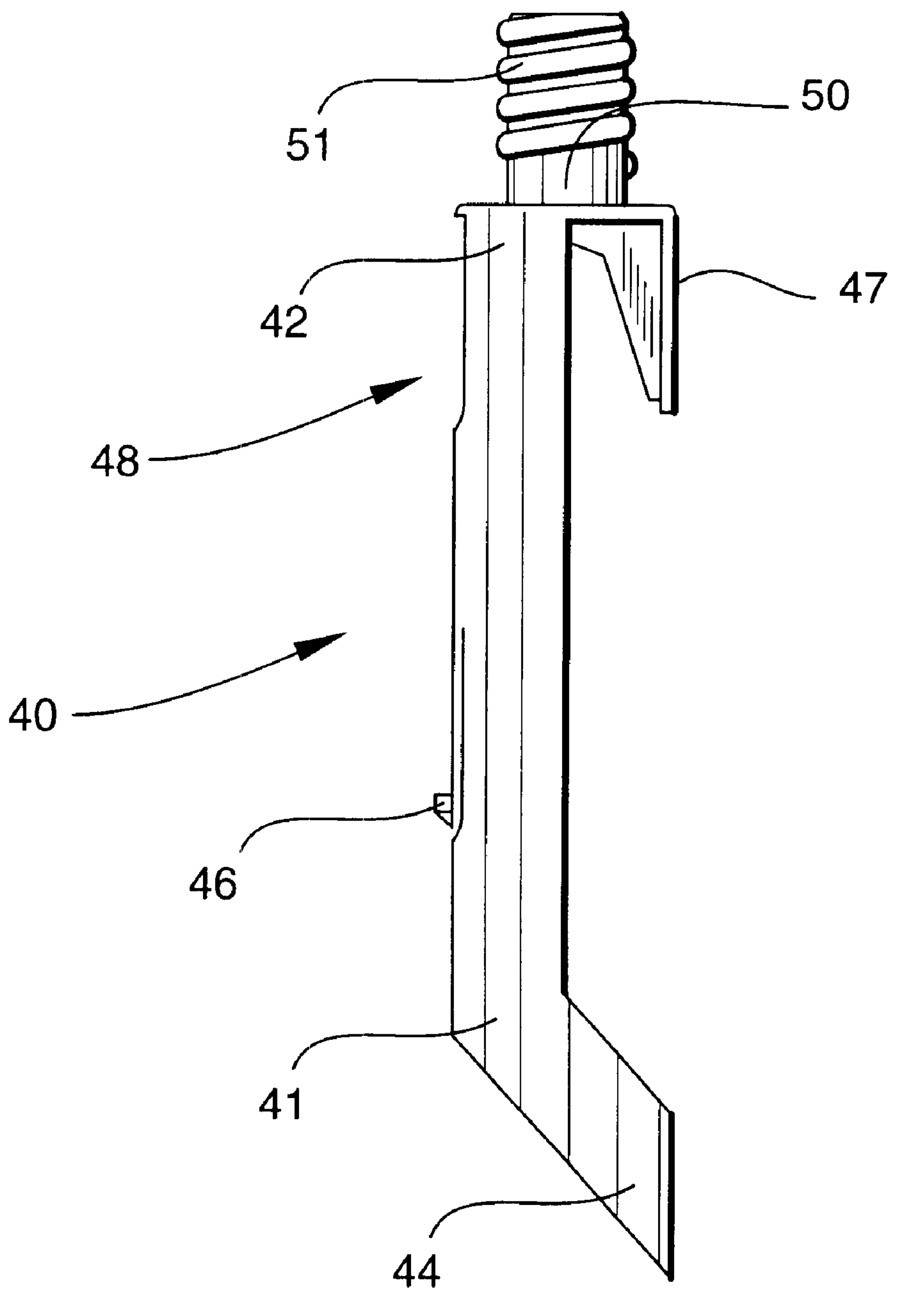
FIG. 8 is a side view of the bottom portion of the assembly, according to the present invention.
Figure 9:
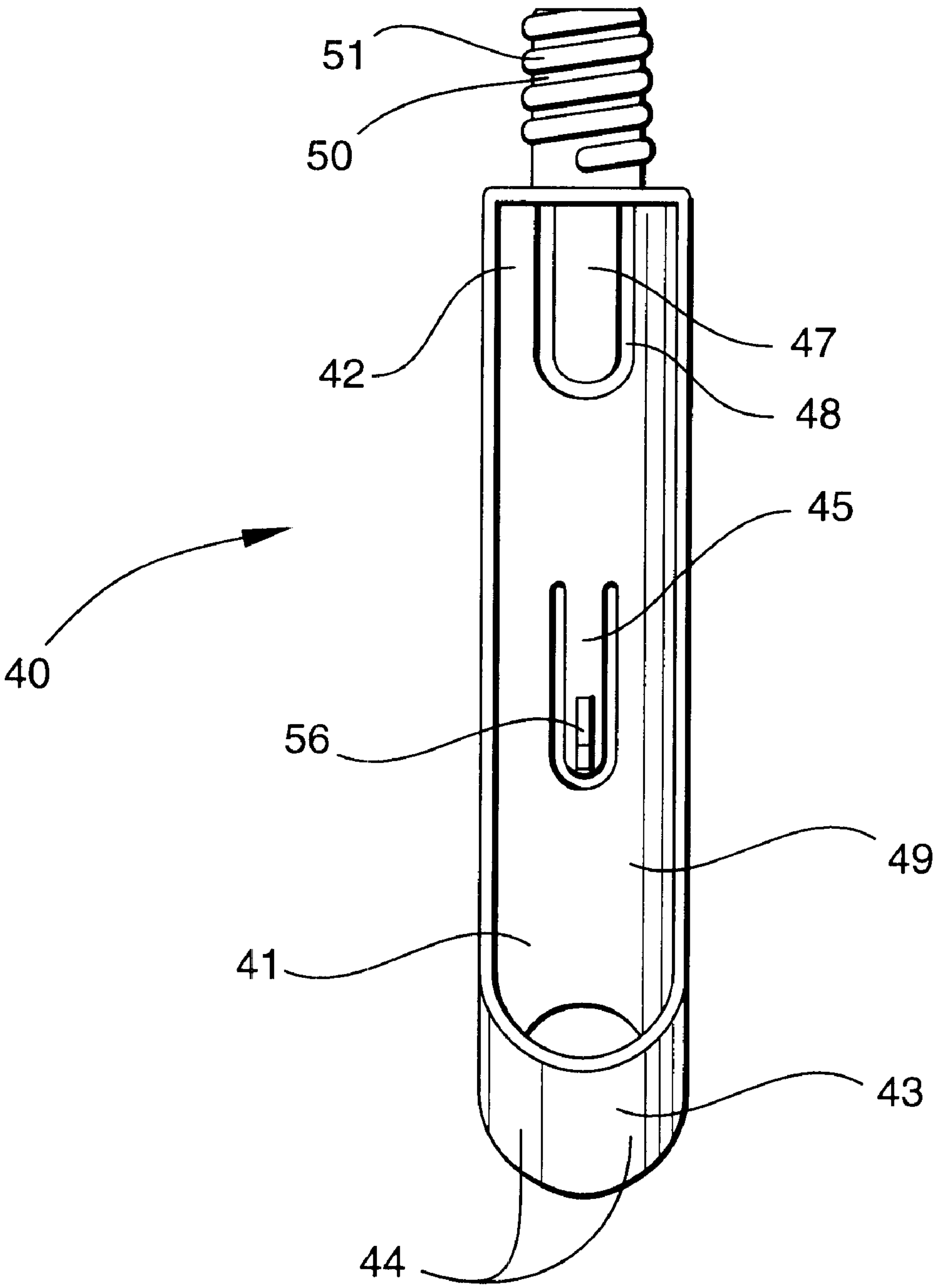
FIG. 9 is another side view of the bottom portion of the assembly (rotated 90 degrees from the view of FIG. 8), according to the present invention.
Figure 10:
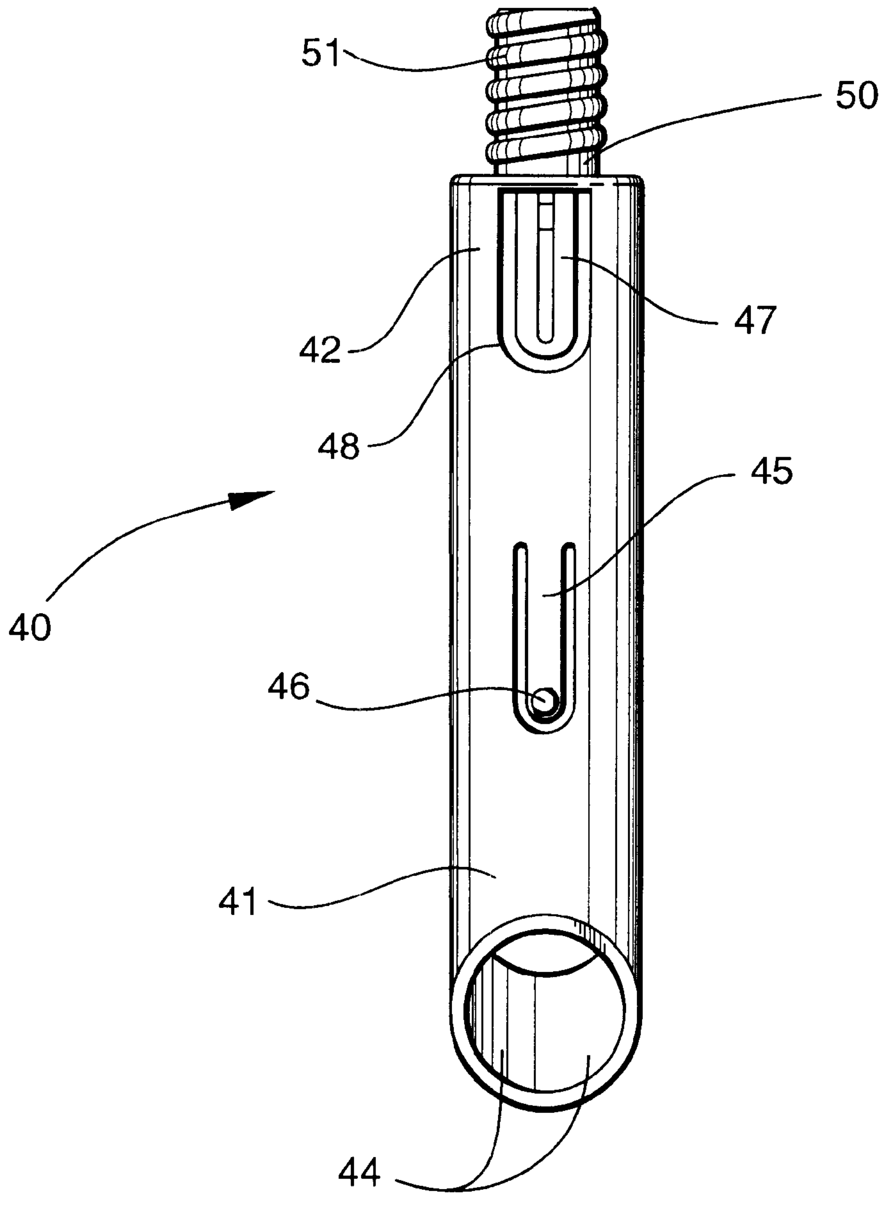
FIG. 10 is yet another side view of the bottom portion of the assembly (rotated 90 degrees from the view of FIG. 8 and 180 degrees from the view of FIG. 9), according to the present invention.
Figure 11:
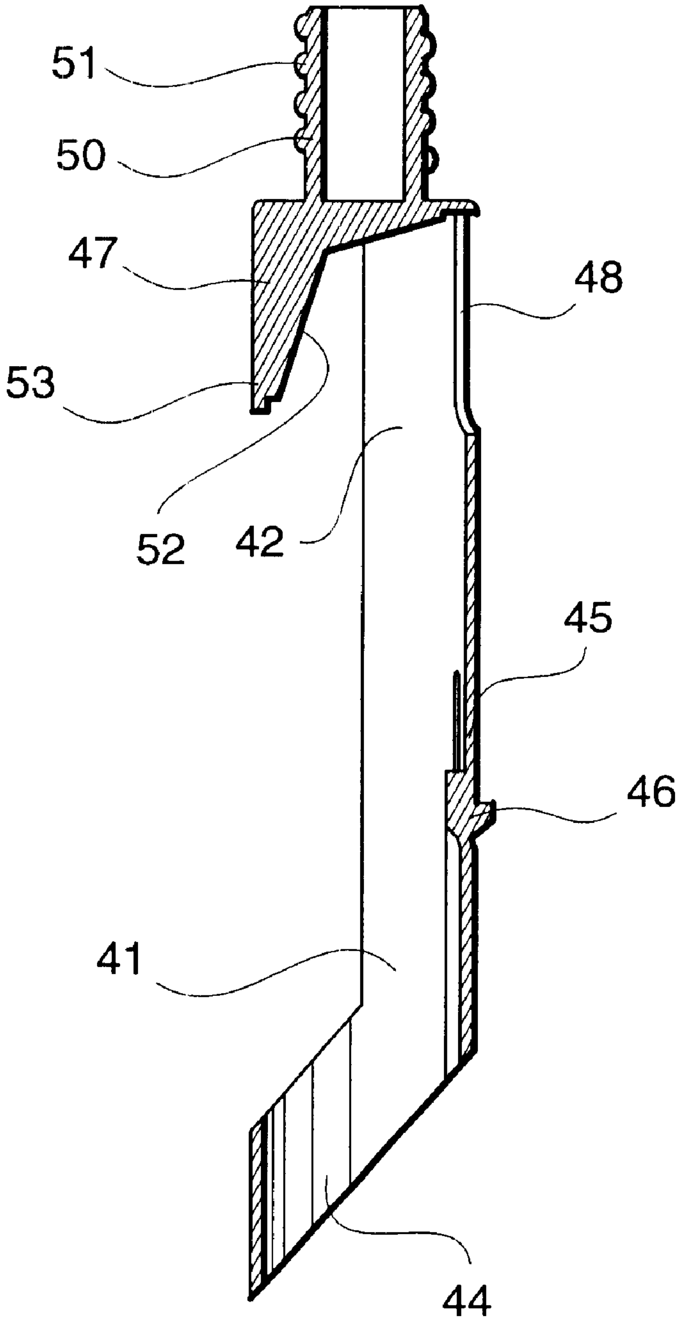
FIG. 11 is a cross-sectional view of the bottom portion of the assembly, according to the present invention.
Figure 12:
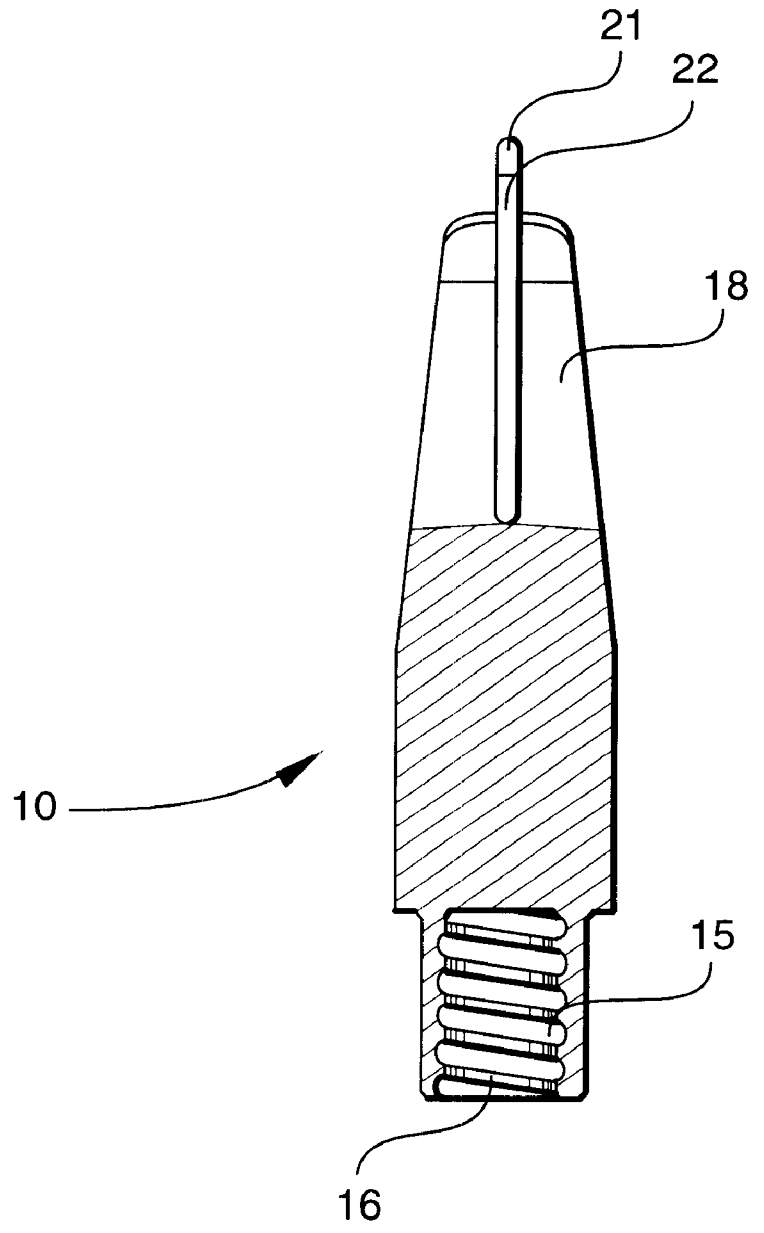
FIG. 12 is a cross-section view of the top portion of the assembly, according to the present invention.

In reference to FIGS. 1–5 and 12, the spool mounting portion 10, which attaches to the pole mounting portion 40, has a central body 20 that includes a first spool support 21 that projects away from the body 20, at an acute angle relative to the rotational axis of the tube of a bottom mounting section 15. This spool support 21 is generally flat, but may be elongated in shape with a curved distal end. The first spool support 21 necessarily has a light string support surface 18 that is on an inward section of the spool support 21. There is a second spool support 24 located at an opposite position relative to the central body 20. The second spool support 24 also has a spool support surface, 26, and is designed to also aid in taking down light strings that are already mounted. The light string support surface 18 of the first spool support 21 may include a wire hook 29 that is used to adjust the position of the ornamenta light stings. The wire hook 29 projects away from the center of the device and over a distal portion of the first spool support 21 has a top surface 22 that may be used Lo help support any reel attached to the device.

The spool mounting portion 10 includes a spool spindle 25 that is designed to receive an ornamental storage string spool. The string spool mounts onto the spool mounting portion 10 of the present invention in a removable and rotational relationship. Thus, the string spool may freely rotate about the spool spindle 25. The spool spindle 25 is preferably mounted as an arm that projects away from the center of the device, at a generally perpendicular direction to the plane that contains the light string support surface and spool support surfaces, 18 and 26. Located at a distal end of the spool spindle 25 is a spindle tab 23, which may be a conic portion 31, with an axial slit 32 mounted on a post 33. The largest diameter of the conic portion 31 is larger than the diameter of the post, which results in a circular projection at the base of the conic portion 31. The largest diameter of this conic portion is also designed to be slightly larger than an axial aperture that would be found on the light string storage spool. In this manner, the base of the conic portion 31 must be forced through the aperture (with the two segments of the conic section 31 moving slightly together under pressure). The spindle tab 23 then holds the spool to the spindle mounting portion 10, ready to rotate and distribute ornamental light strings.

The bottom mounting section 15 is attached to the central body 20 near the second spool support 24 and is a hollow tubular structure that contains internally located threads 16. Preferably, the sizing of the hollow tubular structure and internally located threads is complementary with the threaded end of certain pool poles and removable mop handles. Thus, by using the bottom mounting section 15 with an already existing handle that has a complementary threaded end, the top portion 10, may be used to mount and adjust ornamental lighting strings without using the bottom portion 40.

If an already existing handle that has a complementary threaded end is not available, then the bottom portion 40, the pole mounting portion, must be used in the assembly. The pole mounting portion 40 is an elongated structure that is partially tubular, such as when a tube is bisected along the longitudinal axis. Thus, there is an inner curved surface 49 and an outer curved surface 43. Located at a first end 41 of the partial tube are two quasi-flexible enclosures 44 that projects around the rotational axis of the partial tube. The quasi-flexible enclosure 44 generally fits around a pole or other elongated structure that is inserted within the quasi-flexible enclosure 44 and inner curved surface 49. The quasi-flexible enclosure 44 is preferably quasi-flexible in order to accommodate a range of different diameter poles. At a second end 42 of the partial tube is a clamping tang 47. The clamping tang 47 projects longitudinally in relation to the partial tube and is offset from the rotational axis of the partial tube. The clamping tang 47 has an inner surface 52 that slopes away from the rotational axis. When a pole or other elongated object is inserted into the space between the clamping tang 47 and the inner curved surface 49 of the partial tube, the end of the pole becomes wedged, or secured between the sloping surface 52 of the clamping tang 47 and the inner surface 49 of the partial tube. Thus, it is clearly seen that a variety of different diameter poles may be inserted into the pole mounting portion 40 and still be snuggly and securely held in place.

There is an aperture 48 that may be located opposite of the clamping tang 47. This aperture 48 is useful for accommodating lengthy objects that have attachments, such as hook, located at distal ends thereof.

Finally the pole mounting portion 40 may include a flexible tab 45 located on a back section of the partial tube that includes pool pole interior snap 56 or a pole exterior tensioner 46. The interior snap 56 is located at a distal end of the flexible tab 45, on an exterior surface thereof, while the pole exterior tensioner 46 is located at the distal end of the flexible tab 45, on an inner surface thereof.

Located at the second end 42 is a top portion mounting section 50, which is generally tubular in shape with externally located threads 51. Preferably, the externally located threads 51 are compatible and receivable by the internally mounted threads 16 of the bottom mounting portion 15. Thus, the bottom portion 40 may be screwed into the top portion 10 to create an assembly that may be mounted on a pole, such as a mop or broom handle or pool pole.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. An assembly for mounting and positioning ornamenta light strings comprising a top portion comprising:

A. a central body with

B. a firsT spool support located at one end of the central body,

C. a second spool support located at an opposite end of the central body,

D. a spool spindle located on the central body between a light string support surface, and E. a bottom mounting section that is located on the central body near the second spool support;

wherein the spool spindle further includes a spindle tab that comprises a conic portion with an axial slit mounted on a post that extends between the conic portion and the spool spindle.

2. The assembly according to claim 1 wherein the first and second spool supports and light string support surface have surfaces that are co-planar.

3. The assembly according to claim 2 wherein the light string support surface further includes at least one wire hook for adjusting ornamental light strings located near a distal end of the light string support surface.

4. The assembly according to claim 1 in combination with a bottom portion comprising:

A. a hemi-tubular body with a first end and a second end,

B. an enclosure located near the first end of the body,

C. a top mounting section located near the second end of the body, and

D. a clamping tang located near the first end of the body.

5. The bottom portion according to claim 1 further including a flexible tab located on a back section of the body.

6. The bottom portion according to claim 5 wherein the flexible tab further includes an interior snap and an exterior tensioner, both located as a distal end of the flexible tab.

7. The bottom portion according to claim 6 wherein the clamping tang further includes an inner surface that slopes away from the rotation axis of the bottom portion.

8. The bottom portion according to claim 4 wherein the top mounting section located near the second end of the body further has externally mounted screw threads that are complementarily receivable by the internally mounted screw threads of the bottom mounting section of the top portion.

9. The bottom portion according to claim 8 further including a flexible tab located on a back section of the body.

10. The bottom portion according to claim 9 wherein the flexible tab further includes an interior snap and an exterior tensioner, both located at a distal end of the flexible tab.

11. The bottom portion according to claim 10 wherein the clamping tang further includes an inner surface that slopes away from the rotation axis of the bottom portion.

* * * * *